June 13, 1939. A. W. HERRINGTON 2,162,334
POWER SHAFT UNIT FOR FOUR-WHEEL DRIVE
Filed Feb. 25, 1935 4 Sheets—Sheet 1
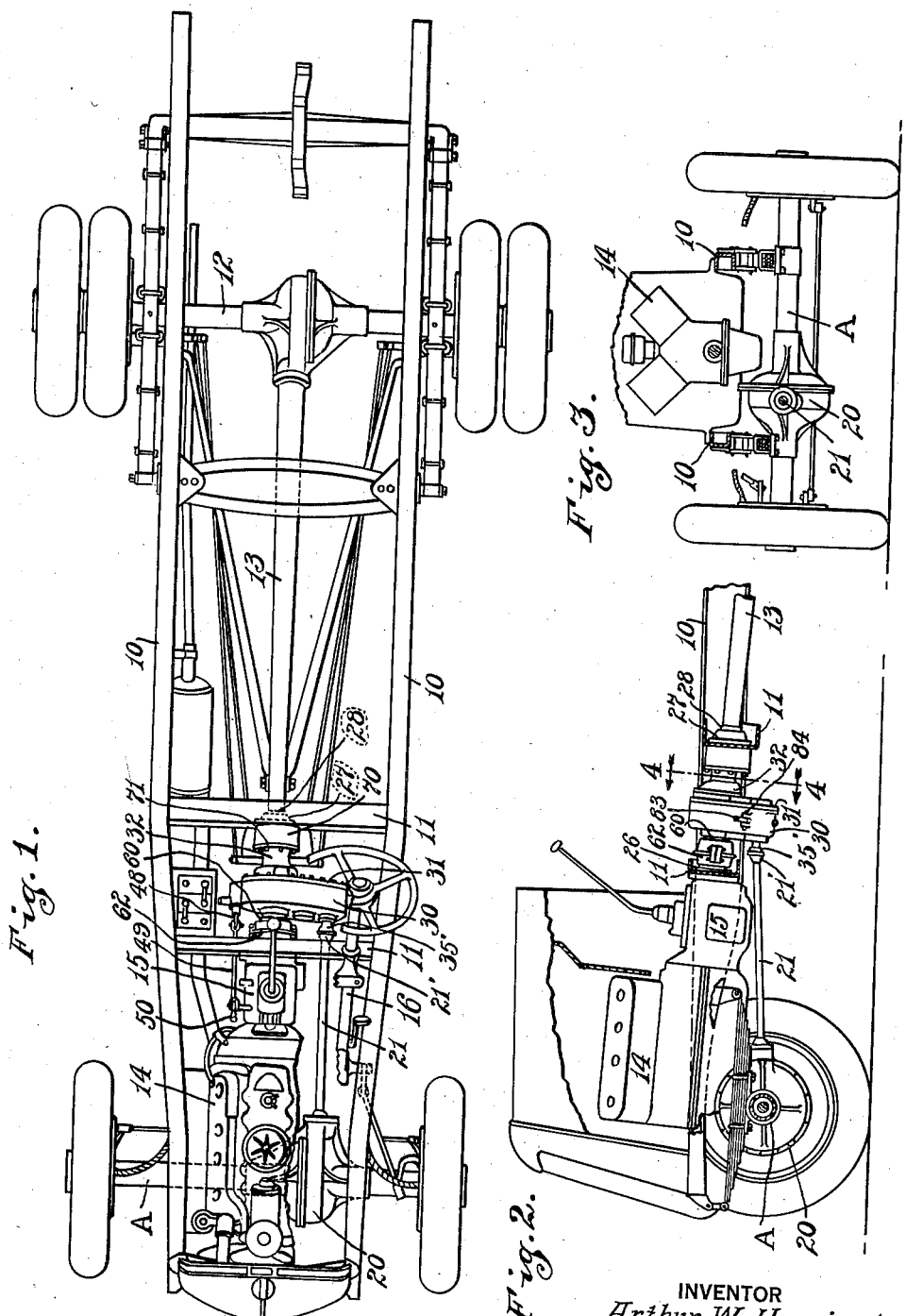
INVENTOR
*Arthur W. Herrington,*
BY
*Hood + Hahn.*
ATTORNEYS

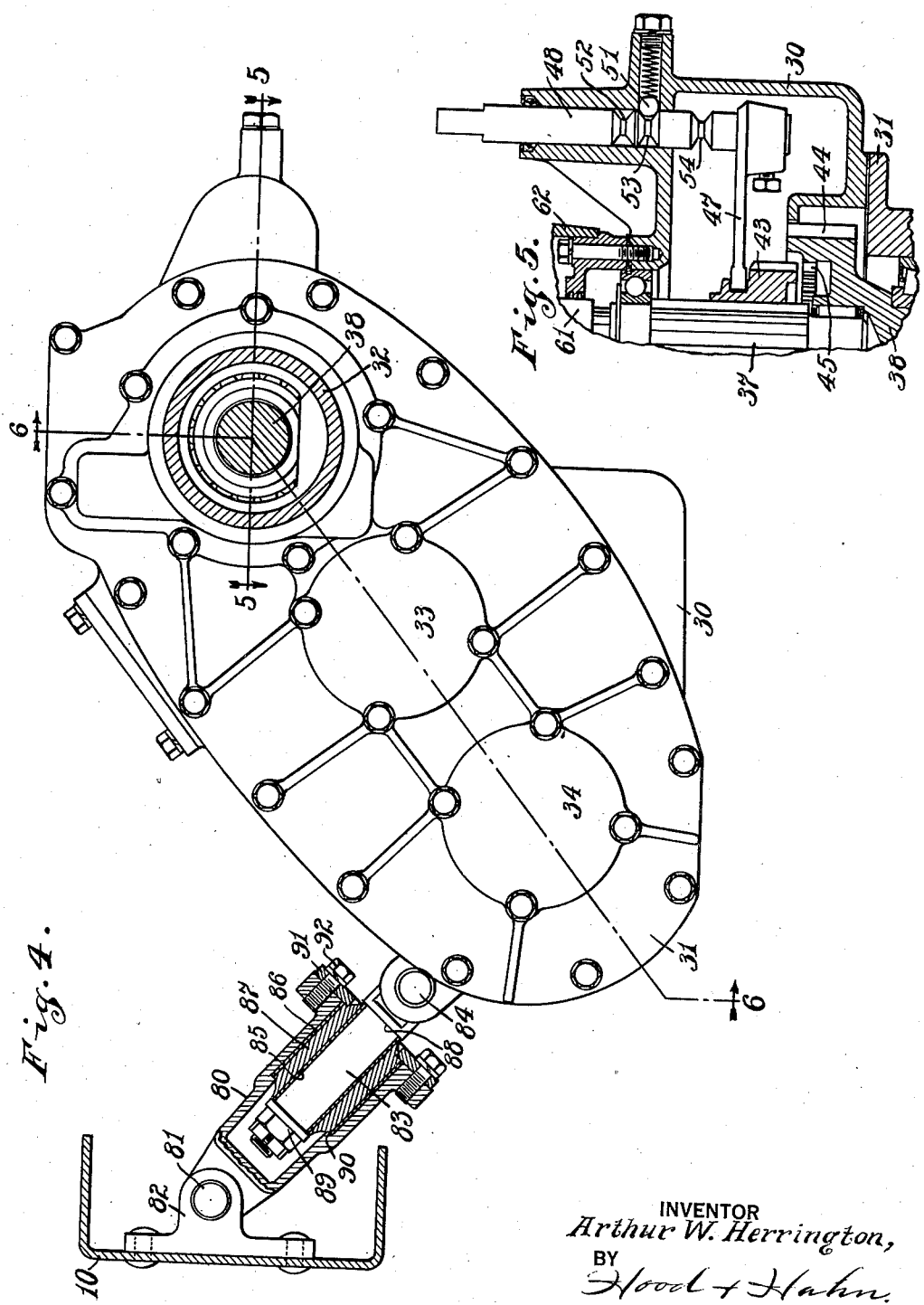

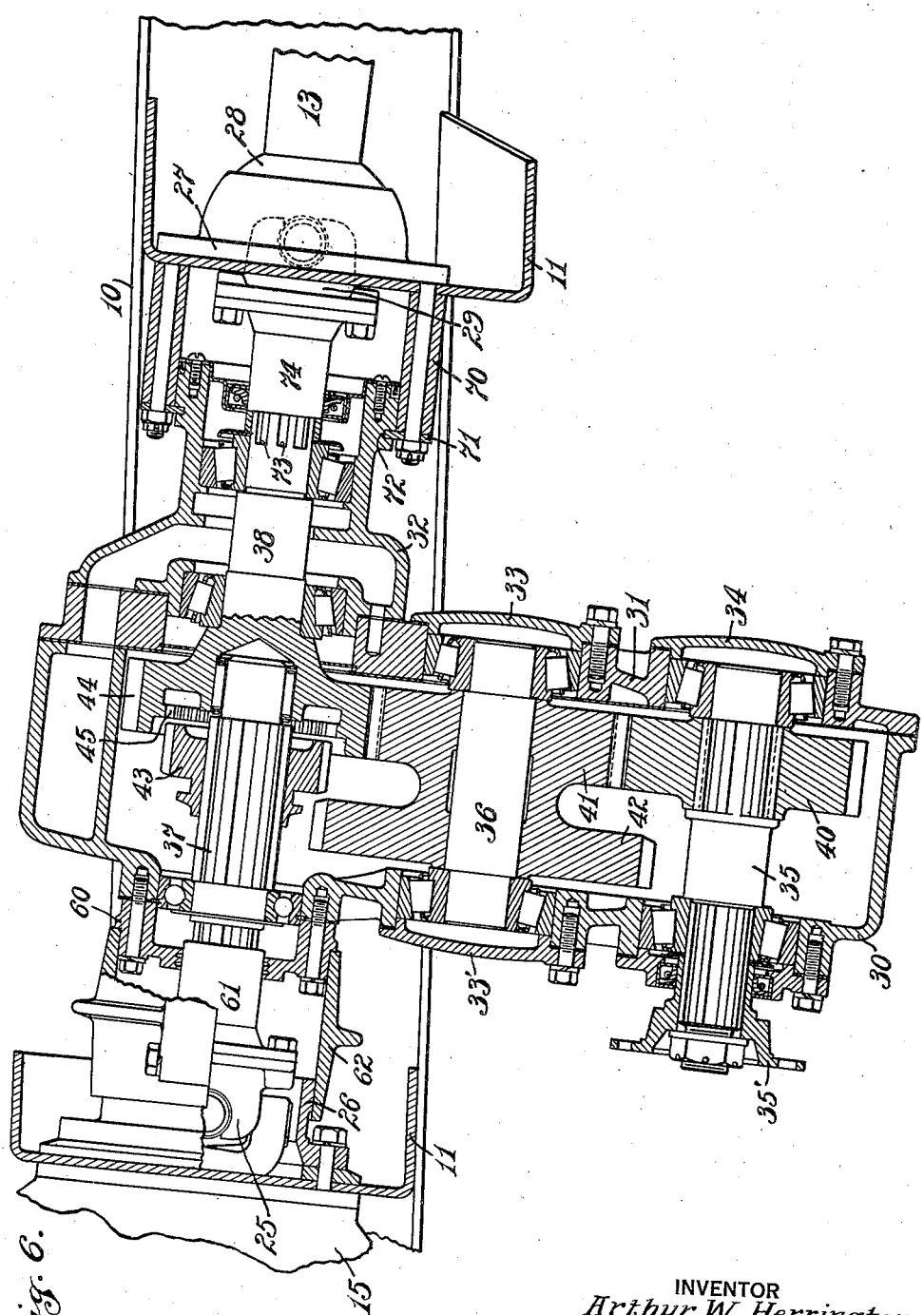

June 13, 1939.　　　A. W. HERRINGTON　　　2,162,334
POWER SHAFT UNIT FOR FOUR-WHEEL DRIVE
Filed Feb. 25, 1935　　　4 Sheets-Sheet 4
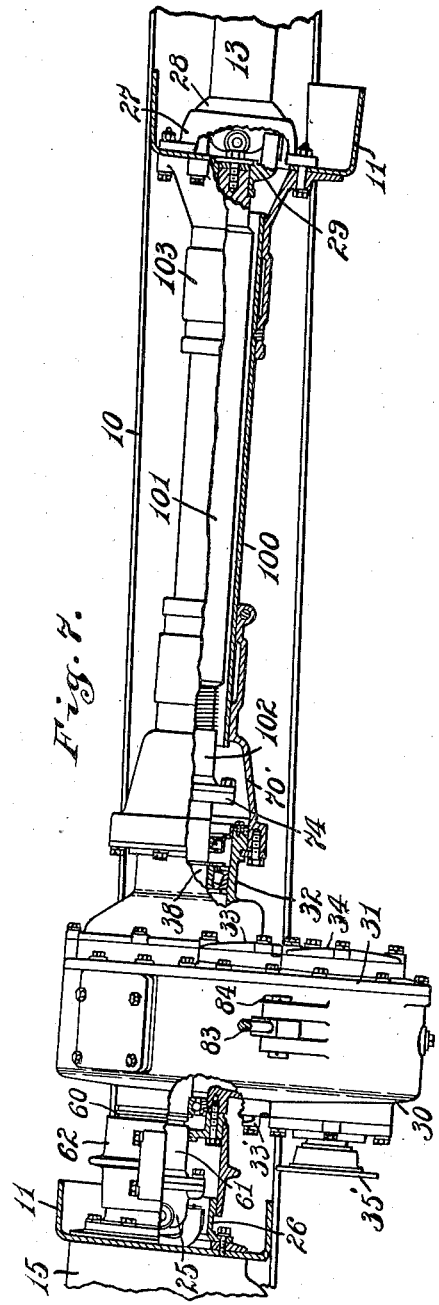
INVENTOR
Arthur W. Herrington,
BY
Hood & Hahn.
ATTORNEYS Patented June 13, 1939

2,162,334

UNITED STATES PATENT OFFICE 2,162,334

POWER SHAFT UNIT FOR FOUR-WHEEL DRIVE

Arthur W. Herrington, Indianapolis, Ind., assignor to Marmon-Herrington Company, Inc., Indianapolis, Ind., a corporation of Indiana Application February 25, 1935, Serial No. 7,976

10 Claims. (Cl. 180—44)

The primary object of my invention is to provide a power transmission unit by means of which a Ford automobile of the two-wheel drive type may be readily converted, in conjunction with a driven steering wheel axle structure, into an automobile of the four-wheel drive type.

Another object of my invention is to provide an improved power transmitting unit for use in an automobile of the driven steering wheel type, for transmission of power from the motor to such steering wheels.

The accompanying drawings illustrate my invention:

Fig. 1 is a plan of a modern Ford chassis modified by the inclusion of my invention;

Fig. 2 is an elevation, in partial vertical section, of the front end of the structure shown in Fig. 1;

Fig. 3 is a diagrammatic transverse section showing the relation of the front axle with the motor;

Fig. 4 is a section, on a larger scale, on line 4—4 of Fig. 2;

Fig. 5 is a section on line 5—5 of Fig. 4;

Fig. 6 is a section on line 6—6 of Fig. 4; and

Fig. 7 is a side elevation, in partial vertical section, on a scale between that of Figs. 1 and 4, of a unit embodying my invention and designed for a vehicle having a longer wheel base than that shown in Fig. 1.

In the drawings, 10, 10 indicate the side bars and 11, 11 intermediate cross bars of a chassis frame, 12 the rear axle, 13 the torque tube, 14 the motor, 15 the transmission gearing, and 16 the steering post of the most modern Ford automobile.

In such a vehicle there lies between the rear end of the transmission gearing 15 and the front end of the torque tube 13 between the cross bars 11, 11, a shaft unit which serves as a connection between the power delivery shaft of the transmission gearing and the power transmitting shaft which is journaled within the torque tube 13.

In this type of automobile differences in length of wheel base are attained by variations of the lengths of those portions of the chassis side bars 10 between the two cross bars 11, 11 and by the utilization of the above-described intermediate shaft unit.

In order to convert such an automobile into a four-wheel drive type I substitute a front axle structure A of the steering driving wheel type, said axle comprising a casing, the intermediate portion 20 of which encloses the necessary differential gearing. The casing portion 20 has an external shape substantially as indicated in Fig. 3, which is unsymmetrical relative to the vertical plane passing through the power delivery shaft 21 in that the larger diameters of casing 20 extend laterally to one side of this vertical plane a much shorter distance than they extend to the other side. I therefore arrange axle A relative to motor 14, as shown in Fig. 3, so that the aforesaid shorter extending portion of casing 20 will be adjacent the motor. By this arrangement I am able to provide the necessary vertical clearance between the front axle and the lowermost portions of the motor with a lower positioning of the motor than would be possible if axle A were reversed relative to the motor.

In such an arrangement the axis of the power transmitting shaft 21 will be below and laterally offset from the axis of the torque tube 13.

In order to transmit power from the motor both to the driven front steering wheels and to the driven rear wheels I provide the improved power transmitting unit now to be described.

Referring more particularly to Figs. 4, 5, and 6, 11, 11 are intermediate cross bars of the chassis of a short wheel base car. Anchored upon the front one of these cross bars is the casing structure of transmission 15 from which projects through and rearwardly beyond cross bar 11 the universal joint structure 25 and projecting rearwardly from and secured to said front cross bar 11 is a sleeve 26 which partially encloses the universal joint 25. Secured to the rear face of the rear cross bar 11 is a housing 27 which receives the ball end 28 of the torque tube 13 and within this structure is mounted the universal joint 29 which is carried by the front end of the car transmission shaft journaled in the torque tube. These parts are existing elements in the Ford car and between these parts I insert my improved unit.

This unit comprises a main shell 30 having a cover 31 supplemented by a bearing sleeve 32 and covers 33 and 34. The main shell is supplemented by a cover 33' alined with cover 33. Journaled within this shell structure is a power delivery shaft 35, an intermediate shaft 36, a power receiving shaft 37, and a power delivery shaft 38, the shafts 37 and 38 being alined. Shaft 35 carries a gear 40, shaft 36 carries a twin gear comprising portion 41 which meshes with gear 40, and a portion 42 in position to be intermittently meshed by a gear 43 splined upon shaft 37. Shaft 38 carries a gear 44 which meshes with gear 41 and shaft 38 is also provided with an internal set of teeth 45 into which gear 43 may be clutched. Gear 43 may be shifted axially upon its splines on shaft 37 by the shifting yoke 47 (Fig. 5) carried by a rod 48 which is connected by rod 49 (Fig. 1) to a shifting lever 50 mounted upon the transmission unit 15 for convenient access by the driver. Positions of gear 43 in mesh with gear 42 or in clutching engagement with teeth 45, or neutral to these two elements may be obtained by shifting rod 48 which will be held in selected position by the usual yielding locking ball 51 (Fig. 5) in engagement with groove 54 for gear-meshing position, in groove 53 for neutral position, and in groove 52 for clutching position.

In order that the power delivery shaft 35 may properly coordinate with shaft 21, the above-described structure is so positioned that the plane of its shafts 35, 36, 37, and 38 is inclined downwardly and laterally and there is splined upon the front end of shaft 35 a coupling member 35' which is secured to coupling member 21' on the rear end of shaft 21.

In order to aline the rear end of joint 25 (Fig. 6) with the front end of shaft 37 there is secured to shell 30 a ring 60 and the rear end of joint 25 is provided with a coupling member 61, the rear end of which is telescoped into this ring and is internally splined to receive the forward end of shaft 37.

The forward end of ring 60 and the rear end of sleeve 26 are externally of the same diameter and are axially alined so as to receive a two-part coupling sleeve 62 which may be clamped thereon to form a rigid connection between sleeve 26 and shell 30.

Mounted upon the front face of the rear cross bar 11 is a ring 70 into which is projected the rear end of bearing sleeve 32 and an axially firm but rotative union is established between these parts by means of the split ring 71, the inner periphery of which lies within groove 72 formed in sleeve 32. The rear end of shaft 38 is splined at 73 to receive the coupling sleeve 74 which is attached to the front element of the universal joint 29, as shown in Fig. 6.

The torque exerted upon shell 30 is resisted by the coupling, shown in Fig. 4, between the lower end of the shell and the adjacent side bar 10 of the chassis. This coupling comprises a cup 80, pivotally anchored at 81 upon bracket 82 secured to side bar 10, a rod 83 pivoted at 84 to shell 30 and a yielding connection between cup 80 and rod 83. The rod 83 is telescoped within cup 80 and the above-mentioned yielding connection is a tubular structure which is sleeved upon rod 83 and into cup 80 and comprises an internal tube 85, an external tube 86, and an intermediate tube 87 of rubber which is vulcanized to the two tubes 85 and 86. Tube 85 is anchored upon rod 83 between shoulder 88 and nut 89 and tube 86 is anchored in cup 80 between shoulder 90 and ring 91 held upon the open end of cup 80 by bolts 92.

The structure described above has been designed for a short wheel base car. For a longer wheel base car the structure is substantially identical except that instead of the parts 70 and 74 I provide the structure shown at the right-hand end of Fig. 7. In this construction, the rear end of sleeve 32 is projected into a shell 70' carried by the forward end of a tube 100, of an appropriate length and within which is mounted a shaft 101 provided at its forward end with a coupling 102 connected to coupling 74 and connected at its rear end with the forward element of the universal joint 29. The rear end of tube 100 is provided with a shell 103 which is bolted to the front face of the rear cross bar 11.

Referring again to Fig. 6, it will be noted that by removing from a standard car, of short wheel base, those parts between the two cross bars 11, and preserving the universal joints 25 and 29 with their respective couplings 61 and 74, the unit disclosed in Fig. 6 may be bodily substituted.

A similar substitution may be made, in the longer wheel base car by utilizing the unit disclosed in Fig. 7.

When gear 43 is clutched into clutch 45 transmission of power from the motor to front and rear axles is obtained at the various speeds and in the directions determined by the setting of the regular transmission gearing 15.

By shifting gear 43 into mesh with gear 42 a new set of speed ratios, based upon the ratios establishable by transmission gearing 15, is obtainable, thus giving a desirable power increase for heavy conditions.

I claim as my invention:

1. In an automobile, the combination with the chassis frame and substantially medially located motor, of a rear driving wheel axle supporting the rear end of the frame, a substantially medial driving connection between the motor and said axle embodying a speed and direction changing transmission gear, a power take-off interposed between said transmission gearing and the rear axle, with the power delivery element thereof offset laterally relative to the medial vertical plane of the frame, a driving wheel front axle supporting the front end of the chassis frame, said front axle having a radially enlarged intermediate casing housing the differential of said axle, having less lateral extent to one side of its power-receiving shaft than the other and positioned with that lesser projecting portion adjacent the motor, and a power shaft connecting said front axle with the power delivery element of said power takeoff.

2. In an automobile, the combination with the chassis frame and substantially medially located motor, of a rear driving wheel axle supporting the rear end of the frame, a substantially medial driving connection between the motor and said axle embodying a speed and direction changing transmission gear, a power takeoff interposed between said transmission gearing and the rear axle and embodying a set of speed changing means affecting the power connection leading to the rear axle, with the power delivery element thereof offset laterally relative to the medial vertical plane of the frame, a driving wheel front axle supporting the front end of the chassis frame, said front axle having a radially-enlarged intermediate casing housing the differential of said axle, having less lateral extent to one side of its power-receiving shaft than the other and positioned with that lesser projecting portion adjacent the motor, and a power shaft connecting said front axle with the power delivery element of said power takeoff.

3. In an automobile, the combination with the chassis frame, front drive wheel axle, rear drive wheel axle, and motor, of a power delivery train interposed between the motor and rear axle and embodying a speed and direction changing transmission gearing and a power takeoff interposed between said transmission gearing and rear axle, said power takeoff comprising a gear train and an enclosing casing journaled upon the chassis frame on the axis of its power receiving shaft, and a connection between the casing of the power takeoff train and the chassis frame offset from the axis of the power-receiving element of said takeoff and yieldable tangentially thereof.

4. In an automobile, the combination with the chassis frame, front drive wheel axle, rear drive wheel axle, and motor, of a power delivery train interposed between the motor and rear axle and embodying a speed and direction changing transmission gearing and a speed-varying power takeoff interposed between said transmission gearing and rear axle, said power takeoff comprising a gear train and an enclosing casing journaled upon the chassis frame on the axis of its power-receiving shaft, and a connection between the casing of the power takeoff train and the chassis frame offset from the axis of the power-receiving element of said takeoff and yieldable tangentially thereof.

5. In an automobile, the combination with the chassis frame, a driving wheel rear axle supporting the rear end of said frame and driving wheel front axle supporting the front end of said frame, a motor mounted upon said frame, a power train connecting said motor with the rear axle, said power train comprising a power takeoff between the motor and rear axle, said power takeoff comprising a gear train having a power delivery shaft offset relative to the aforesaid power connection, and an enclosing casing journaled upon the axis of said power connection, a two-speed power connection between said delivery element of the takeoff and the front axle, and a connection between the said casing and the chassis frame yieldable tangentially relative to the power connection between the motor and the rear axle.

6. In an automobile, the combination of chassis frame, two frame-supporting driving axles and their supporting wheels spaced longitudinally of the frame, a motor mounted on the frame, a motor driven shaft having its outer end enveloped in a frame-carried shell, a propeller shaft substantially aligned with said motor driven shaft with one end connected to one of the driving axles and its other end axially spaced from said motor driven shaft and enveloped in a frame-carried shell, a transfer casing interposed between and complementing said two enveloping shells, an input shaft journalled in said casing with its receiving end projecting therefrom, a driving connection between the delivery end of the motor driven shaft and the projecting end of said input shaft, an output shaft journalled in said casing in alignment with said input shaft and with its delivery end projecting from the casing, a driving connection between the delivery end of said output shaft and the receiving end of said propeller shaft, a second power delivery shaft journalled in said casing with its delivery end projecting therefrom, means interconnecting said input shaft and the two output shafts whereby said output shafts may be synchronously driven, and a second propeller shaft connecting the said second output shaft with the other driven axle.

7. In an automobile, the combination of chassis frame, two frame-supporting driving axles and their supporting wheels spaced longitudinally of the frame, a motor mounted on the frame, a motor driven shaft having its outer end enveloped in a frame-carried shell, a propeller shaft substantially aligned with said motor driven shaft with one end connected to one of the driving axles and its other end axially spaced from said motor driven shaft and enveloped in a frame-carried shell, a transfer casing interposed between and complementing said two enveloping shells and pivotally associated therewith on an axis substantially aligned with said power driven shaft and propeller shaft, an input shaft journalled in said casing with its receiving end projecting therefrom, a driving connection between the delivery end of the motor driven shaft and the projecting end of said input shaft, an output shaft journalled in said casing in alignment with said input shaft and with its delivery end projecting from the casing, a driving connection between the delivery end of said output shaft and the receiving end of said propeller shaft, a second power delivery shaft journalled in said casing with its delivery end projecting therefrom, means interconnecting said input shaft and the two output shafts whereby said output shafts may be synchronously driven, and a second propeller shaft connecting the said second output shaft with the other driven axle.

8. In an automobile, the combination of a chassis frame, two axle structures therefor each of the driven wheel type spaced longitudinally of the frame, a motor, a speed-varying transmission having a power output shaft with a housing for the delivery end thereof, a propeller shaft leading to one of the axle structures and provided at its power receiving end with a housing, a power takeoff unit comprising a casing in which is journalled a power input shaft and an aligned power output shaft and a second power output shaft laterally offset relative to the aligned input shaft and the first-mentioned output shaft, together with means by which the two output shafts may be connected to or disconnected from the input shaft, the said casing of the takeoff unit having portions coaxial with the power input shaft and associable respectively with the housing of the power output shaft of the transmission and the housing and receiving end of the first mentioned propeller shaft.

9. In an automobile, the combination of a chassis frame, two axle structures therefor each of the driven wheel type spaced langitudinally of the frame, a motor, a speed-varying transmission having a power output shaft with a housing for the delivery end thereof, a propeller shaft leading to one of the axle structures and provided at its power receiving end with a housing, a power takeoff unit comprising a casing in which is journalled a power input shaft and an aligned power output shaft and a second power output shaft laterally offset relative to the aligned input shaft and the first-mentioned output shaft, together with means by which the two output shafts will be driven by the input shaft, a connection between the transmission output shaft and the power input shaft of said unit, a connection between the first-mentioned output shaft and the propeller shaft, housing means associated with said power takeoff unit housing the aforesaid connections and forming a pivotal mounting for the power takeoff unit coaxial with its input shaft, a propeller shaft connecting the second-mentioned output shaft with the other axle structure, and a torque resisting element interposed between the casing of the power takeoff unit and the chassis frame, said torque resisting element including a resilient member permitting limited swing of the casing of the takeoff unit about the axis of its power input shaft.

10. A four-wheel-drive conversion unit for normal two-wheel-drive automobiles comprising, a casing, a power input shaft journaled therein and projecting from one face thereof, a power output shaft journaled in the casing in alinement with the input shaft and projecting from the opposite face of the casing, journaling projections on opposite faces of the casing coaxial with said input and output shafts by which the casing may be supported, a second power output shaft journaled in the casing laterally offset from the first mentioned output shaft and projecting from the casing, and driving connections between the input shaft and the two output shafts.

ARTHUR W. HERRINGTON.